United States Patent [19]

Evans

[11] Patent Number: 5,400,211
[45] Date of Patent: Mar. 21, 1995

[54] PACKAGED ELECTRICAL COMPONENT

[75] Inventor: David A. Evans, Seekonk, Mass.

[73] Assignee: The Evans Findings Company, Inc., East Providence, R.I.

[21] Appl. No.: 955,142

[22] Filed: Oct. 1, 1992

[51] Int. Cl.$^6$ .............................................. H01G 9/08
[52] U.S. Cl. .................... 361/502; 361/275.1; 361/301.3; 361/517; 361/534; 429/86; 429/82
[58] Field of Search ............ 361/502, 517, 521, 518, 361/519, 520, 535-539, 272, 274.1, 275.1, 301.3, 534; 29/25.03; 174/52.1, 52.2, 52.3; 429/82, 86

[56] References Cited

U.S. PATENT DOCUMENTS

| | | |
|---|---|---|
| 2,628,271 | 2/1953 | Brafman . |
| 2,806,982 | 9/1957 | Holik et al. ............... 361/521 |
| 3,197,547 | 7/1965 | Peace, Jr. et al. . |
| 3,261,902 | 7/1966 | Pearce et al. ............... 361/517 |
| 3,277,350 | 10/1966 | Pearce et al. . |
| 3,524,112 | 8/1970 | Ruttkay et al. . |
| 3,537,173 | 11/1970 | Sparrow et al. ............ 361/517 |
| 3,669,302 | 6/1972 | Markarian . |
| 3,690,325 | 9/1972 | Kenny ....................... 174/52.2 |
| 3,812,280 | 5/1974 | Deckert . |
| 3,909,302 | 9/1975 | Mermelstein . |
| 3,943,937 | 3/1976 | King et al. ................. 429/57 |
| 4,266,332 | 5/1981 | Markarian et al. .......... 361/519 |
| 4,683,516 | 7/1987 | Miller ........................ 361/328 |
| 4,769,745 | 9/1988 | Viernickel et al. . |
| 4,992,910 | 2/1991 | Evans ........................ 361/502 |

FOREIGN PATENT DOCUMENTS 55-87421  7/1980  Japan .

Primary Examiner—Bruce A. Reynolds
Assistant Examiner—Gregory L. Mills
Attorney, Agent, or Firm—Leydig, Voit & Mayer

[57] ABSTRACT

A packaged electrical component includes an electrical component having at least two electrical leads, the electrical component generating a gas during operation, and a package enclosing the electrical component with the leads extending from the package, the package consisting of at least one selectively permeable material having a relative high permeability to a gas generated within the package during operation of the electrical component and a relatively low permeability to at least one other fluid, such as water, that may be present inside and/or outside the package.

17 Claims, 8 Drawing Sheets

PACKAGED ELECTRICAL COMPONENT

FIELD OF THE INVENTION

The present invention relates to packaged electrical components that generate a gas during operation. More particularly, the present invention relates to a package that allows the generated gases to escape without the escape of desired fluids from the package or the admission into the package of deleterious materials.

BACKGROUND OF THE INVENTION

It is well known in the electrical packaging arts that certain electrical components, for example, electrolytic capacitors, electrochemical cells, batteries of electrochemical cells, and double layer capacitors, can produce gases during continued operation. The pressure of those gases can rupture or burst a package. In order to avoid undue pressure increases within packages containing such components, it is desirable that gases generated within the package escape.

Packages incorporating membranes or plugs that respond to excessive internal pressures are known. Those packages may incorporate a membrane that ruptures or a plug that fuses or is expelled from a package in response to excessive internal pressure. These "one time" pressure relief mechanisms are extremely undesirable in many applications. Once a membrane is ruptured or a plug is melted or expelled, the electrical component within a package is exposed to the ambient. Essential fluids within the package can escape and undesired fluids, such as oxygen and water, can enter the package to cause or accelerate corrosion or other performance degradation mechanisms.

A porous diaphragm may also be used to release internal pressure. In U.S. Pat. No. 3,524,112, an electrolytic capacitor incorporating a membrane of rubber or neoprene having a diameter of 1 to 5 millimeters and a thickness of 0.5 to 2 millimeters is described. The membrane permits hydrogen diffusion out of the capacitor while preventing escape of the electrolyte. That patent also describes an electrolytic capacitor casing having a groove. A polycarbonate foil having a thickness of 0.02 millimeters is wrapped around the casing over the groove. When pressure within the capacitor becomes too large, an edge of the foil is temporarily displaced from the package surface and allows gas to escape. In addition, the foil permits hydrogen to diffuse out of the capacitor. The displacement of the foil means that foreign matter can enter the package and electrolyte can escape from the package.

A battery vent employing a membrane that is permeable to oxygen and hydrogen but that is impermeable to the sulfuric acid electrolyte is described in U.S. Pat. No. 3,909,302. The membrane, having a thickness of 0.1 to 0.8 millimeters, is microporous polytetrafluoroethylene. The membrane holds back the liquid battery electrolyte while permitting the gases to escape from the battery so long as the liquid electrolyte does not occlude the membrane.

Double layer capacitors employ electrolytic elements comprising activated carbon and an electrolyte, typically sulfuric acid. The carbon contains many pores, producing a very large surface area for charge storage. Two of these electrolytic elements are brought together with an intervening ion conducting, electrically insulating separator to form a capacitor element. For increased operating voltage, many of the capacitor elements are stacked with intervening electrically conductive plates as terminals of the individual capacitor elements. See U.S. Pat. No. 4,683,516, the disclosure of which is incorporated herein by reference.

Double layer capacitors have an extremely high energy storage density. Capacitances of one farad and more with essentially unlimited voltage capabilities can be produced by connecting double layer capacitor elements in parallel and series. Double layer capacitors can generate carbon dioxide during operation. At least some of the carbon dioxide is believed to be reactively produced from oxygen that has been adsorbed on the carbon in the capacitor elements and from oxygen that may leak into the package. Therefore, venting of carbon dioxide and exclusion of external oxygen from a packaged double layer capacitor has been recognized as an important packaging goal.

Even though the total amount of carbon dioxide generated in a double layer capacitor is relatively small, the small volume of a typical double layer capacitor package that is not occupied by solid materials, i.e., the "empty volume" means that relatively large pressures can build up from the generated gas. For example, a package having an "empty volume" of one cubic centimeter may be able to withstand an internal pressure of ten atmospheres without bursting. If the packaged capacitor has a design lifetime of ten years, the average gas generation rate cannot exceed about $3 \times 10^{-6}$ moles per year without bursting the package before the end of its design lifetime.

In double layer capacitors, as in other electrical components that generate gases, a displaceable, fusible, or rupturable plug or a similar pressure-relief mechanism that gives access, even temporarily, to the inside of the package is highly undesirable. That access permits the undesirable entry of deleterious materials into the package, such as oxygen in a double layer capacitor, and allows useful materials, e.g., electrolyte, to escape, seriously degrading performance. In double layer capacitors, electrolyte loss, measured by the decrease in the weight of the packaged component, causes a catastrophic decline in capacitance and increase in equivalent series resistance (ESR). (The ESR is a measure of the degree of difficulty of charging and discharging a capacitor. Since a high ESR means a capacitor has failed, ESR is a particularly sensitive indicator of a capacitor's condition.)

In the inventor's U.S. Pat. No. 4,992,910, the disclosure of which is incorporated herein by reference, a package for an electrical component that generates a gas during operation is described. That package includes a metal container and a means for selectively venting the gas generated within the package. That means for selectively venting may be a selectively permeable body disposed within and closing an opening in the metal container that permits a gas generated with the package to escape from the package while retaining within the package at least one desired fluid different from the generated gas so that premature failure of the electrical component and/or the package is prevented. Generally, the permeable body is a polymeric material, such as silicone rubber, polypropylene, natural rubber, butyl rubber, polytetrafluoroethylene, or polyethylene. While the package described in U.S. Pat. No. 4,992,910 is effective in preventing premature failure of a packaged component and the package, the package requires relatively complex manufacturing techniques. The selectively permeable material must be attached in some way, for example, with an adhesive, to the metal container. One of the best performing selectively venting polymeric materials is polytetrafluoroethylene, sold by Dupont under the trademark TEFLON. However, polytetrafluoroethylene is notoriously difficult to attach to a metal.

Accordingly, it is desirable to provide a packaged electrical component including a package that is easily manufactured wherein the electrical component generates a gas during operation and the package permits the generated gas to escape from the package but retains desired fluids within the package and that prevents undesirable materials from entering the package.

SUMMARY OF THE INVENTION

According to the present invention, a packaged electrical component includes an electrical component having at least two electrical leads, the electrical component generating a gas during operation, and a package enclosing the electrical component with the leads extending from the package, the package consisting of at least one selectively permeable material having a relatively high permeability to a gas generated within the package during operation of the electrical component and a relatively low permeability to at least one other fluid, such as water, that may be present inside and/or outside the package.

In another aspect of the invention, a packaged electrical component includes an electrical component having at least two electrical leads, the electrical component generating a gas during operation, and a package enclosing the electrical component with the leads extending from the package, the package being entirely made of selectively permeable materials having a relatively high permeability to a gas generated within the package during operation of the electrical component and a relatively low permeability to at least one other fluid, such as water, that may be present inside and/or outside the package.

The permeable material is preferably a polymeric material, such as silicone rubber, polypropylene, butyl rubber, and natural rubber. Other materials, such as polytetrafluoroethylene, glass-filled polytetrafluoroethylene, and polyethylene of various densities, may be also be employed as the selectively permeable material. The area and thickness of the permeable material in the package are chosen to permit the permeation and escape of the generated gas at a rate that limits the pressure increase within the package to an acceptable value and that does not present a risk of loss of the structural integrity of the package while limiting the permeation of desired fluids, such as water and/or an electrolyte, out of the package to avoid premature failure of the component.

In one embodiment of the invention, the package includes at least two parts that are mutually engaged and include holes for the extension of the leads from the package. The mutually engaged parts may apply pressure to the electrical component within the package through resilient members housed within the package.

In another embodiment of the invention, the package is a unitary body of a molded selectively permeable material that encloses the electrical component.

Packages of packaged electrical components according to the invention may includes walls of varying thicknesses to achieve a desired overall permeability of the package. In addition, the permeability of the package may be varied by applying a coating to all or parts of the package.

Other objects and advantages of the present invention will become apparent from the detailed description given hereinafter. It should be understood, however, that the detailed description and specific embodiments are given by way of illustration only, since various changes and modifications within the spirit and scope of the invention will become apparent from the detailed description.

BRIEF DESCRIPTION OF THE DRAWING FIGURES

Figure 3A:
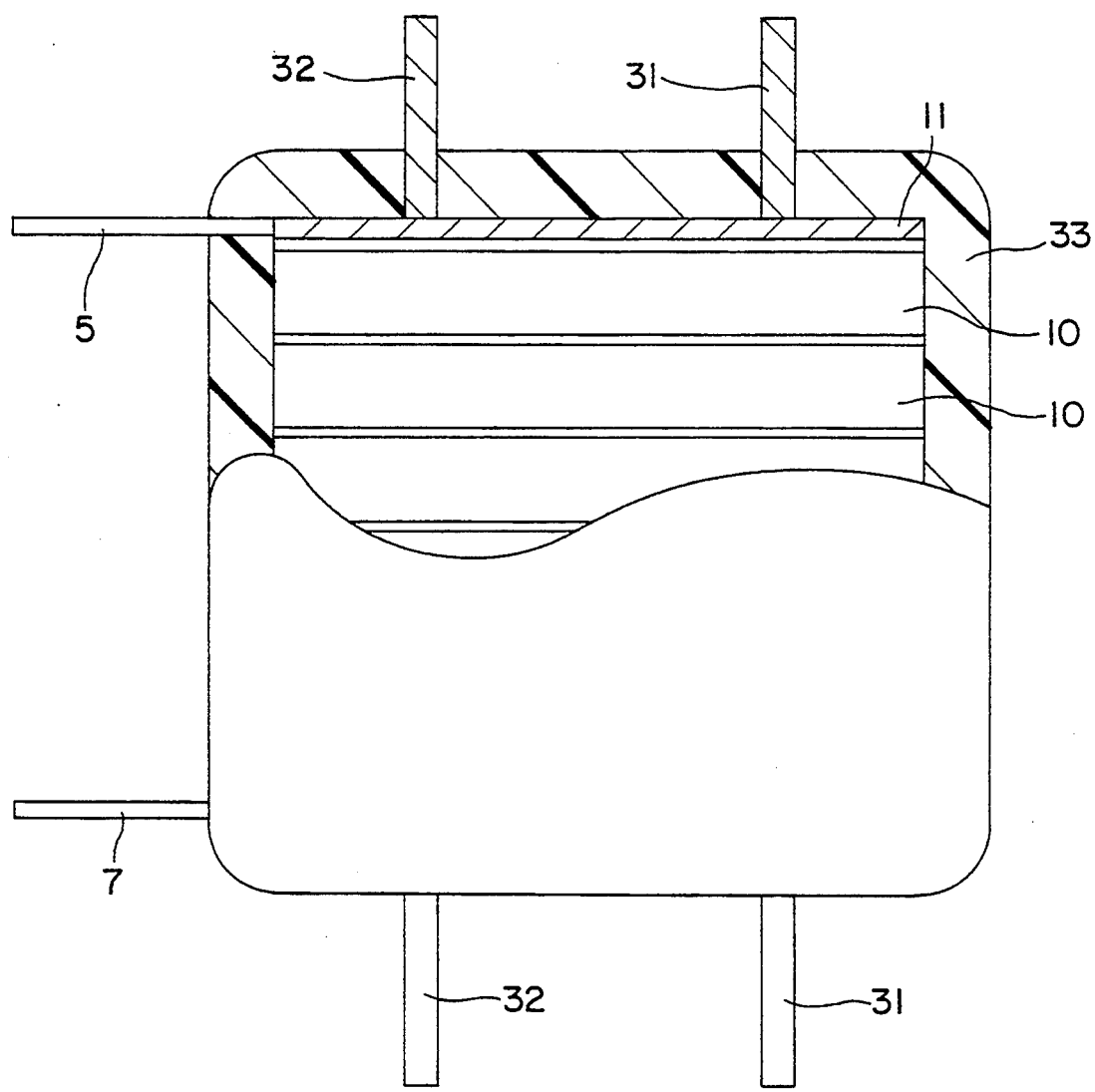
Figure 3B:
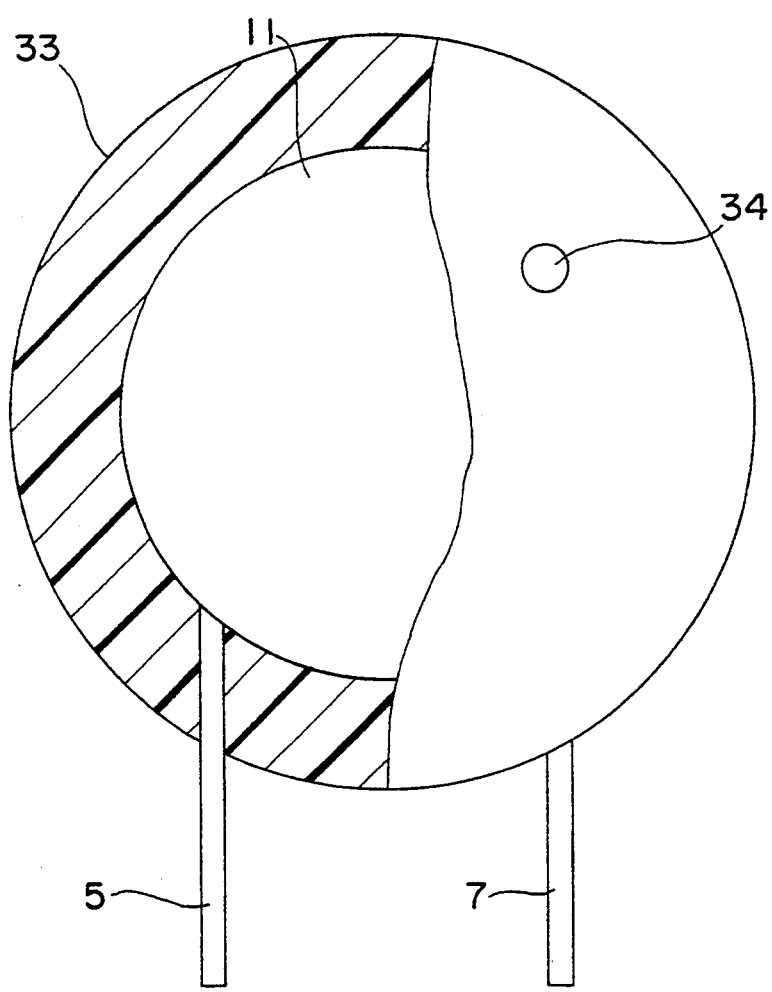

FIGS. 3(a) and 3(b) are partially cutaway side and plan views of a packaged double layer capacitor according to an embodiment of the invention.

Figure 4:
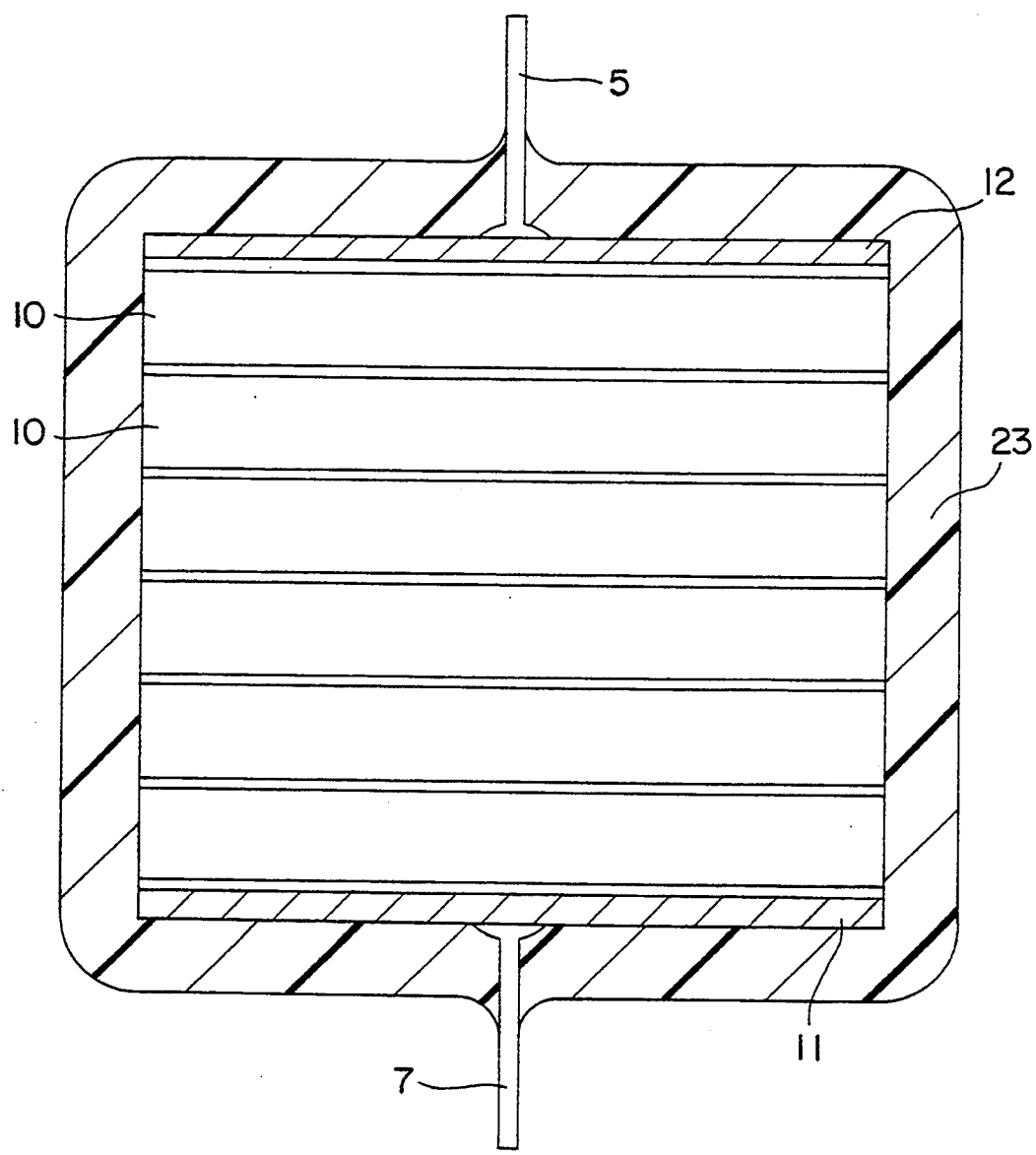

FIG. 4 is a cross-sectional view of a packaged double layer capacitor according to an embodiment of the invention.

Figure 5:
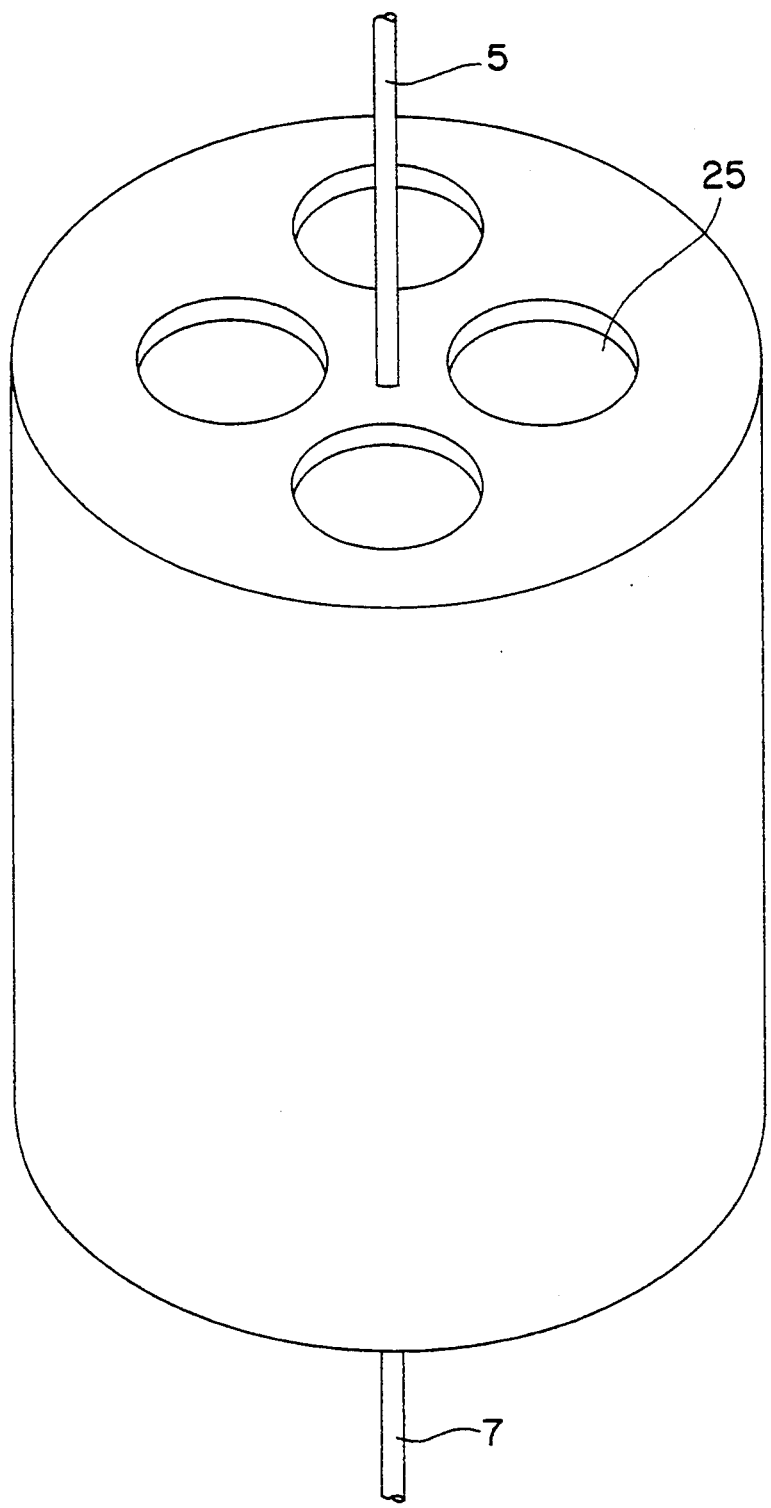

FIG. 5 is a perspective view of a packaged electrical component according to an embodiment of the invention.

Figure 6:
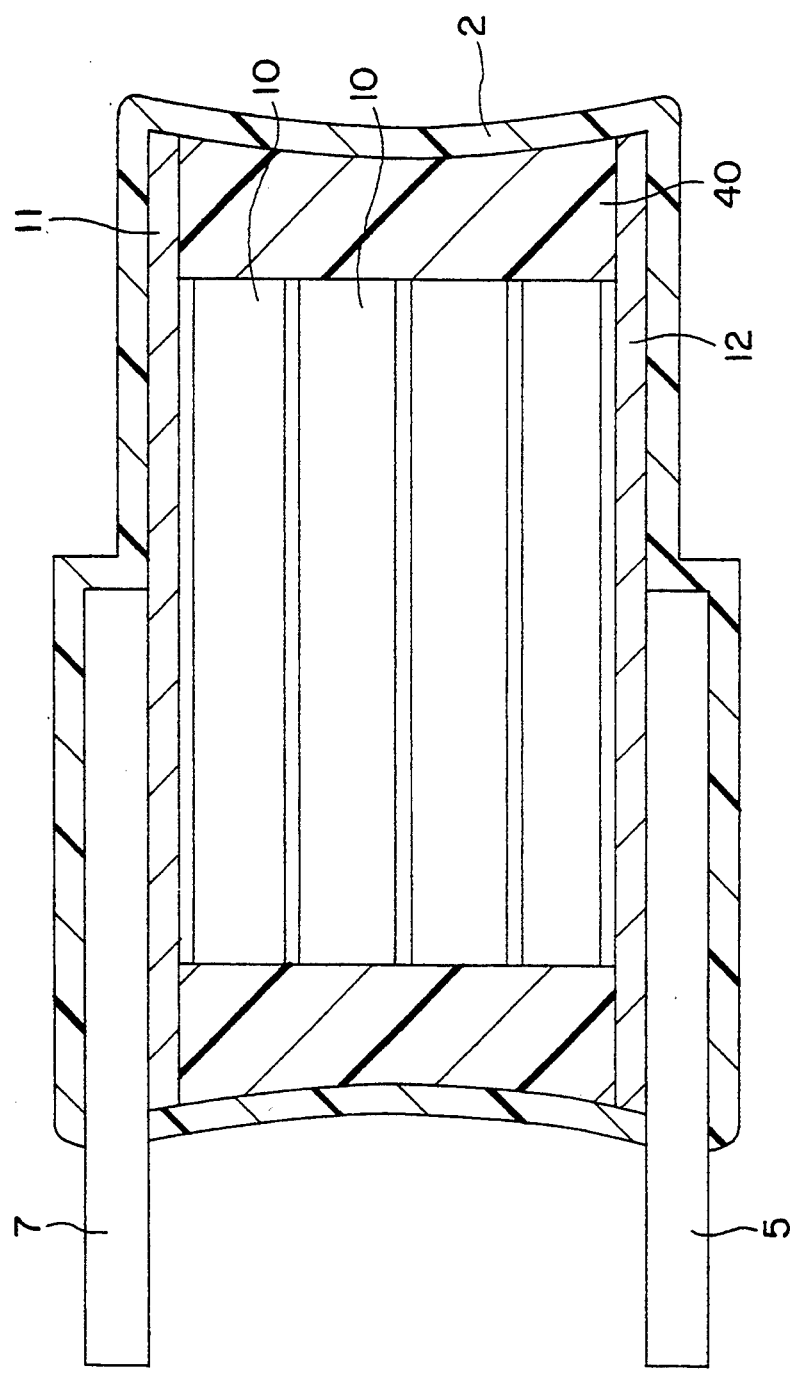

FIG. 6 is a cross-sectional view of a packaged double layer capacitor according to an embodiment of the invention.

Figure 7:
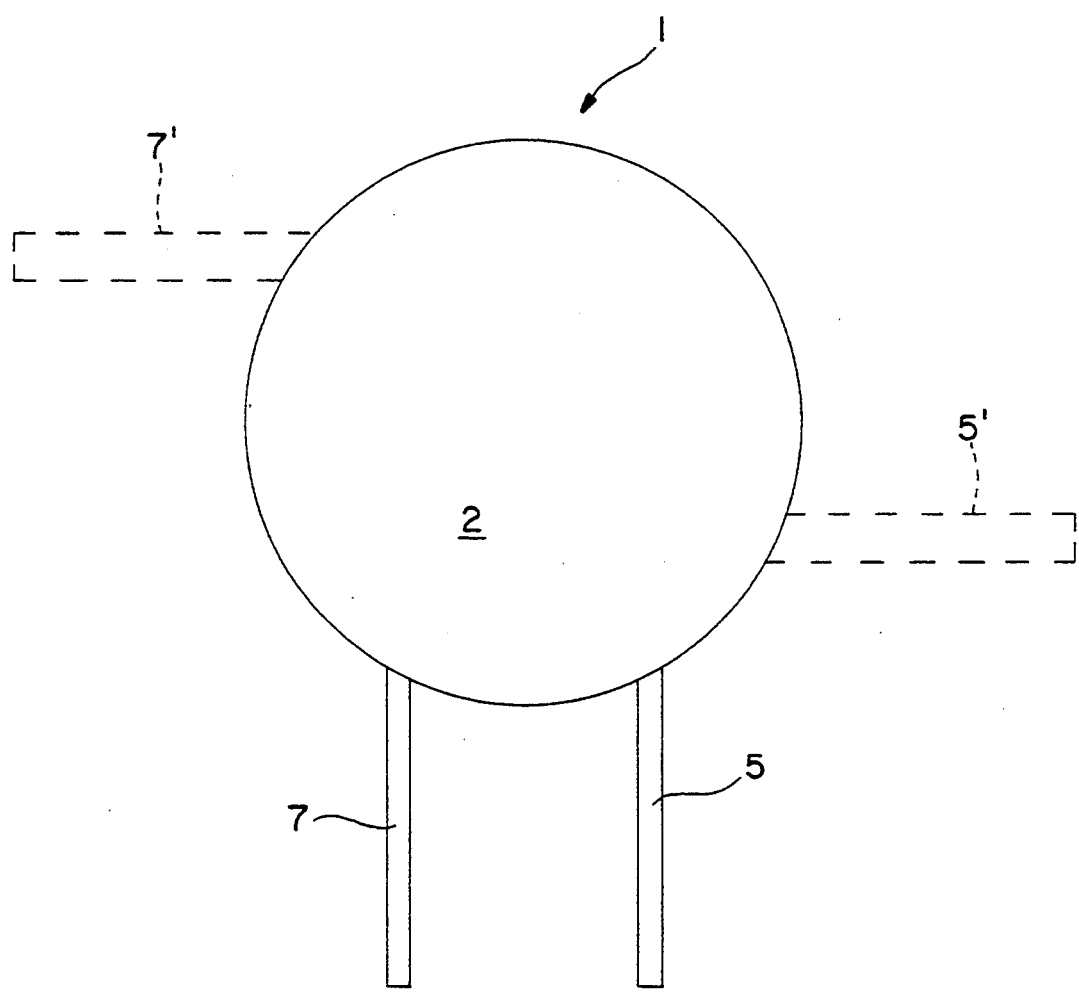

FIG. 7 is a plan view of the packaged double layer capacitor of FIG. 6.

DETAILED DESCRIPTION OF PREFERRED EMBODIMENTS

The invention is described below particularly with respect to a packaged double layer capacitor. However, other packaged electrical components, such as electrolytic capacitors and electrochemical cells, that produce a gas during operation are within the scope of the invention.

Figure 1:
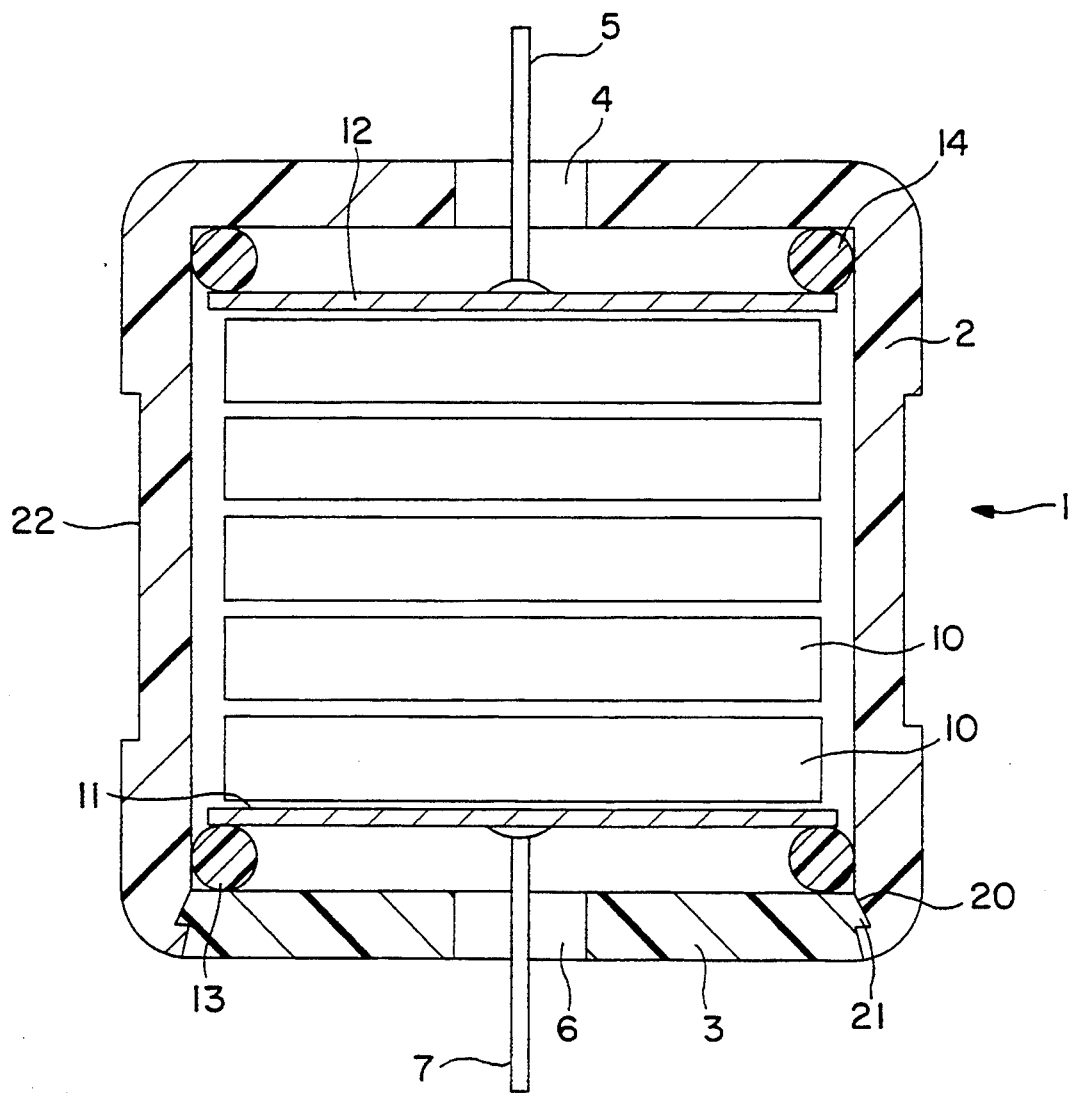
FIG. 1 is a cross-sectional view of a packaged double layer capacitor according to an embodiment of the invention.
Figure 2:
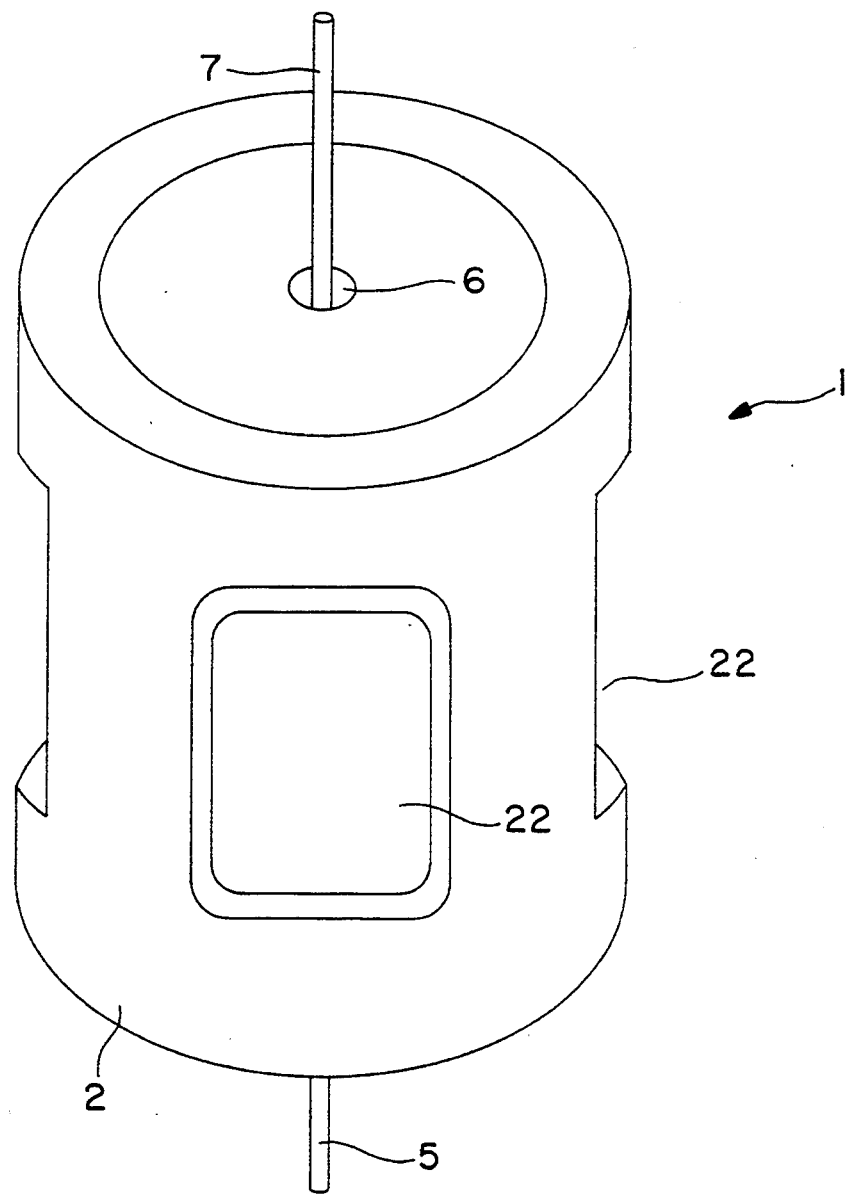
FIG. 2 is a perspective view of a packaged electrical component according to an embodiment of the invention.

FIG. 1 is a cross-sectional view and FIG. 2 is a perspective view of a packaged double layer capacitor 1 according to an embodiment of the invention. In all figures, the same elements have the same reference numbers. The external package includes two parts, a container 2 and an end 3. The container 2 includes an opening 4 through which a lead 5 of the capacitor extends. The end 3 likewise contains an opening 6 through which a lead 7 of the capacitor extends. Depending upon the construction of the capacitor or other electrical component within the package, both leads may extend through one or the other of the container 2 and end 3.

The capacitor includes a stack of capacitor elements 10 within the package. The elements 10 are electrically connected to each other in series through their geometrical arrangement. The stack of elements could also be, for example, electrochemical cells, or could be replaced by a single electrolytic capacitor wound in a conventional "jelly-roll" configuration. One end of the stack rests upon an electrically-conducting plate 11 to which the lead 7 is attached. If that end of the stack is the cathode or negative terminal of the capacitor, the electrically-conducting plate 11 may be a titanium or tantalum current collector. At the other end of the stack, another, similar electrically-conducting plate 12 bears on the stack of elements 10 and is electrically connected to the lead 5.

A compressive force is applied to the stack of capacitor elements 10 through the container 2 and the end 3. As described below, those engaging parts of the package are assembled with a compressive force. That compressive force is maintained when the package parts remain engaged and is transmitted, in the embodiment of FIG. 1, to O-rings 13 and 14 disposed at opposite ends of the packaged component. Those O-rings 13 and 14 are disposed between the electrically-conducting plate 11 and the end 3 and between the electrically-conducting plate 12 and the container 2, respectively, and form fluid tight seals between the container 2, the end 3, and the plates 11 and 12. In other words, each point of contact of the O-rings 13 and 14 is a fluid seal established by compression of the O-rings which also transmit a compressive force on the stack of elements 10. Typically, the O-rings 13 and 14 are made of materials that are not susceptible to damage from the fluids, such as an acidic electrolyte, that are contained within the package. For example, the O-rings 13 and 14 may be ethylene polypropylene, a butyl fluorocarbon, silicone rubber, chlorosulfonated polyethylene, and like resilient materials.

In the embodiment of the invention shown in FIG. 1, the container 2 and the end 3 are made of resilient polymeric materials. The container 2 includes a circumferential groove 20 that engages a peripheral flange 21 of the end 3. The opening in the end of the container 2 that receives the end 3 includes tapered walls that permit the easy insertion of the end 3. During insertion of the end 3, those walls are slightly expanded by the force applied to the end 3 and transmitted by the side wall of the flange 21. When the end 3 is inserted far enough, the flange 21 reaches the groove 20, the outward pressure on the container 2 is released so that the container walls return to their original position, securely engaging flange 21 within the groove 20. This "snap ring" is only one example of an arrangement for assembling the container 2 and the end 3. Other arrangements of engaged containers and ends in a package within the scope of the invention can be devised by those of skill in the art. The "snap ring" arrangement has the advantage of continuing to apply pressure to the electrical component within the package, for example, through the O-rings 13 and 14, as shown in FIG. 1. Applying a continuing pressure to a stack of double layer capacitor elements 10 is important to maintain good electrical contact. Other packages may not apply pressure to the packaged electrical component if no pressure is needed to ensure continued high quality performance of the packaged component.

As discussed above, carbon dioxide is generated during operation of a double layer capacitor, possibly from the reaction of adsorbed oxygen and/or oxygen that enters the package with the carbon in the capacitor element. In the invention, the entire package is made of one or more selectively permeable materials that allow carbon dioxide to permeate through the package and escape into the ambient. The selectively permeable material or materials from which the package is made limit the escape of electrolyte, water, and water vapor, the latter of which are present at least when an aqueous solution electrolyte is present, from the package. In addition, the material from which the package is made is selected so that permeation of oxygen and other undesired fluids into the package, as well as the entry of foreign materials, is prevented.

A partial list of candidate materials for the package appears below in Table 1. In Table 1, the relative permeation rates of carbon dioxide and water are listed for each of a number of polymeric materials that are candidates for the package. The permeation rates are listed along with a calculated ratio of the relative carbon dioxide permeation rate to the relative water vapor permeation rate. The permeation rate ratio provides a figure of merit indicating the relative suitability of each material as the selectively permeable package, the higher the ratio, the better the material. In addition to the materials listed in Table 1, glass-filled polytetrafluoroethylene, particularly twenty-five percent glass-filed polytetrafluoroethylene, is a good material from which to form a permeable package. The glass filling within the polymer improves the mechanical strength of the material, an important property when a package is made entirely of a polytetrafluoroethylene.

TABLE 1

| Polymeric Material | Relative Permeation Rates | | Permeation Rate Ratio |
|---|---|---|---|
| | $CO_2$ | $H_2O$ | |
| Poly(vinylidene chloride) | 1.2 | 7.9 | .15 |
| Epoxy | 35 | 160 | .22 |
| Saran | 18 | 20 | .9 |
| Poly(vinyl chloride) | 79–157 | 80–120 | 1 |
| Poly(vinylidene fluoride) | 59 | 39 | 1.5 |
| Styrene-acrylonitrile copolymer | 1100 | 630 | 1.8 |
| ABS | 1380 | 490 | 2.8 |
| Polychlorotrifluoroethylene | 47 | 12 | 3.9 |
| Polycarbonate | 2156 | 550 | 3.9 |
| Polyoxyphenylene | 2560 | 590 | 4.3 |
| Polystyrene | 4920 | 510 | 9.7 |
| Ethylene-vinyl acetate copolymer | 23600 | 1575 | 15 |
| Neoprene | 7870 | 200 | 39 |
| Polybutadiene | 31000 | 670 | 46 |
| High density polyethylene | 1180 | 20 | 59 |
| Natural rubber | 31500 | 470 | 67 |
| Polypropylene | 1770 | 20 | 89 |
| Silicone rubber | 177000 | 1970 | 90 |
| Low density polyethylene | 5900 | 60 | 98 |
| Butyl rubber | 15000 | 80 | 188 |
| Polytetrafluoroethylene | 2360 | 10 | 236 |

The actual permeation rate for a particular package depends upon the geometric configuration of the package and the effective thickness and effective area of the permeable material or materials of the package. In addition, the permeation rate may be a function of the temperature of the package and the pressure differential across the thickness of the material forming the package.

In order to increase the permeation rate of a package, the effective area of the package may be increased or the effective thickness reduced. However, the effective area and effective thickness of the package must be chosen together to produce a package having the desired mechanical strength. While the package can be made stronger by increasing its thickness, that increased thickness reduces the permeation rate of the package. If the permeation rate of the package is too large, the surface of the package can be partially or totally covered with a coating that reduces the permeation rate of the package. That coating may be another selectively permeable material or some other material, such as a metal film, deposited by sputtering, a vapor deposition process, electroplating, or another process. A metallization would include one or more windows through which fluids can permeate. If the permeation rate is too low, portions of the package may be reduced in thickness, as described below, to increase the overall permeation rate of the package.

An essential consideration in any package design is the maximum internal pressure that the package must withstand. Although large internal package pressures can be avoided by designing a package with a large permeation rate, if the rate of permeation becomes too large, desired fluids, such as water and electrolytes, escape so rapidly, even through the selectively permeable material, that the component within the package may fail prematurely. A package in accordance with the invention can be designed based upon these considerations.

In a package where gas is generated at a rate R, the internal pressure increase $\Delta P$ may be expressed as $$\Delta P = P_i - P_o = tR/A\sigma$$

where $P_i$ = the internal fluid pressure in a package
$P_o$ = the initial fluid pressure in the package, typically one atmosphere
t = the effective thickness of the package through which fluids permeate
A = the effective area of the package through which fluids permeate
$\sigma$ = the permeability of the package material.

Thus, for a particular maximum internal pressure, $P_{imax}$, representing a maximum internal pressure change, $\Delta P$, that a package is intended to withstand, a particular permeable material and a particular gas generation rate, the ratio of the effective thickness to the effective area of the package for avoiding excessive internal package pressure can be determined. Since the initial internal pressure in the package is nominally one atmosphere, $\Delta P$ is usually equivalent to the gauge pressure within the package.

In the packaged electrical component of FIG. 1, the O-rings 13 and 14 seal the closed volume between the electrically-conducting plates 11 and 12. Therefore, the gas that is generated within the stack of double layer capacitor cells 10 is confined to a portion of the lateral walls of the container 2 that is disposed between the electrically-conducting plates 11 and 12 and, therefore, does not escape through the openings 4 and 6. The area and thickness of that portion of the package 2 are the effective area and effective thickness of the package, the important parameters for calculating the permeation rate of the package. If the wall of the package has a uniform thickness, the effective thickness is that uniform wall thickness. An adjustment in one or both of the effective area and effective thickness can be made to produce a package with a desired permeation rate. For example, if the initial permeation rate is too large, the thickness of the container 2 can be increased or a coating can be applied to the inside or outside of the container, lowering the effective permeation rate of the package. If the permeation rate is too small for a wall thickness that is required for structural integrity of the container 2, then a plurality of recesses 22 can be formed in the side walls of the container. The portions of the wall that are not reduced in thickness provide the required package strength and apply a compressive force, if necessary, to the stack of elements 10. If the recesses all have the same wall thickness, the effective permeation rate can be determined by calculating the permeation rate for the recesses, considering their total area, and the permeation rate for the other parts of the effective area of the container 2, i.e., the area outside the recesses, through which gas can permeate. Gas permeates through these two different regions at the same time so that the net effective permeation rate of the package is approximately the sum of the permeation rate of the recesses and the permeation rate of the remaining effective area of the container.

FIGS. 3(a) and 3(b) depict another embodiment of the invention and particularly illustrate a molding method for ensuring that a compressive force is applied to a stack of capacitor elements 10. FIG. 3(a) is a partially cutaway side view particularly illustrating an encapsulation process and FIG. 3(b) is a partially cutaway plan view of the packaged component. The stack of capacitor elements 10 includes an electrically conducting plate 11 bearing on one end of the stack. The lead 5 extends from that plate and the lead 7 extends from a similar plate at the opposite end of the stack that is not visible in the figure. In order to apply a compressive force to the stack, before the beginning of the encapsulation process pairs of pins 31 and 32 are applied to the plates 11 and 12. Although only two sets of pairs of pins are illustrated in FIG. 3(a), additional pins can be employed to ensure that a uniform compressive force is applied to the stack of elements 10. Subsequently, with the pins still in place applying pressure, the stack is encapsulated with a selectively permeable material 33. Thereafter, the pins 31 and 32 are withdrawn and the compressive force is maintained on the stack by the container 33. The removal of the pins leaves holes, such as hole 34 of FIG. 3(b), in the container 33. Those holes may be, but do not need to be, filled in a subsequent molding step, such as in the application of a second selectively permeable material to encapsulate the container 33. Alternatively, the holes can be filled, if desired, with any compatible material, forming a fluid-tight bond with the container 33. Although not illustrated in FIGS. 3(a) and 3(b), the container 33 or a subsequently applied selectively permeable material can include recesses 22, such as are shown in FIGS. 1 and 2, and other features. In addition, coatings offering the permeability rates can be applied to the container 33 between encapsulation steps if a second encapsulant is employed. Other methods of encapsulating a compressed stack of elements 10 in a selectively permeable material can be devised by those of skill in the art.

Another embodiment of the invention is shown in a cross-sectional view in FIG. 4 and in a perspective view in FIG. 5. The elements of FIGS. 4 and 5 are the same as those shown in FIGS. 1 and 2 except that the O-rings of FIG. 1 are not necessary nor present and the package is a unitary molded body 23. That molded body 23 encapsulates the stack of double layer capacitor cells 10 as well as the electrically-conducting plates 11 and 12. The selectively permeable material contacts the leads 5 and 7 that extend from the package. During encapsulation, steps are taken, as described above for the embodiment of FIGS. 3(a) and 3(b), to ensure that the side walls of container 2 act as a spring, applying a compressive force to the stack of elements 10. As in the first embodiment, gas permeation takes place principally along the side walls of the package 23. Permeation rates can be decreased by making the walls thicker and/or coating the walls with a film having a lower permeation rate. That film may be a second layer of a different selectively permeable polymeric material molded around and in contact with the unitary body 23. The effective permeation rate of the body 23 can be increased by adding recesses like the recesses 22 of FIGS. 1 and 2. Although not applicable to the packaged double layer capacitor in FIGS. 1, 2, and 4, additional recesses 25 can be formed in an end of the package, as illustrated FIG. 5. Those end recesses 25 increase the permeation rate of the package for fluids that can reach that area of the package. As discussed above, in a double layer capacitor, the stack of capacitor cells 10 is compressed and disposed between metal plates, thereby confining the area from which gas can escape to the lateral surfaces of the cell stack, as shown in FIGS. 1 and 4. However, other electrical component configurations, for example, the jelly-roll capacitor configuration, electrolytic cells, and the like, packaged according to the invention may include internal volumes or interstices in the package that allow a generated gas to reach the end surfaces of the package and escape through the recesses 24.

Yet another embodiment of the invention is shown in cross-section in FIG. 6 and in plan view in FIG. 7. In that embodiment, the stack of double layer capacitor cells 10 is sandwiched between the electrically-conducting plates 11 and 12. The sides of the stack of cells 10 between the plates 11 and 12 are in contact with and confined by an elastomer 40. That elastomer 40 is in tension as a result of a molding process. Polyurethane and other thermoplastic elastomers that shrink upon setting are appropriate for use as elastomer 40. The shrinkage results in the tensile forces in the elastomer 40 that confines the cell stack. Alternatively, in the course of forming the elastomer 40 by molding, a force can be applied to the elastomer that results in a residual internal tensile force after the completion of the molding process. Leads 5 and 7 are welded to plates 12 and 11, respectively, either before or after the elastomer molding. Thereafter, the assembly is coated with a selectively permeable material. Most conveniently, that coating is applied by dipping the assembly in a solution or precursor, such as uncured silicone rubber, of the selectively permeable material 2. In this embodiment of the invention, it is important that a good bond be formed between the elastomer 40, the capacitor cells 10, and the plates 11 and 12. The permeability characteristics of the elastomer 40 can affect the operation of the capacitor. In the embodiment of the invention shown in FIG. 6, the elastomer 40 is in series, with respect to diffusing species, with the selectively permeable coating 2. Therefore, the total permeability rate through the elastomer 40 and the coating 2 depends upon the sum of the respective permeabilities and the area of the package at the side walls between the plates 11 and 12.

A plan view of the packaged capacitor shown in FIG. 6 appears in FIG. 7. Although in the embodiment of FIGS. 6 and 7, the leads 5 and 7 are wires welded to the respective plates 12 and 11, the leads can alternately be extensions of those plates, as indicated by alternative leads 5' and 7' in FIG. 7.

I claim:

1. A packaged electrical component including:
   an electrical component having at least two electrical leads, the electrical component generating a gas during operation; and
   a package enclosing the electrical component with the leads extending from the package, the package consisting of a selectively permeable material having a relatively high permeability to a gas generated within the package during operation of the electrical component and a relatively low permeability to at least one other gas present inside the package, the package including at least one recess for controlling the permeability of the package.

2. The packaged electrical component of claim 1 wherein the package can withstand a maximum internal pressure of $P_i$ without damage, the package having an effective area A and an effective thickness t through which gas generated in the package can permeate, wherein the ratio of t/A is less than $\sigma P_i/R$, where $\sigma$ is the permeability of the permeable material of the package to the gas generated within the package and R is the rate of generation of gas within the package, and sufficiently large to limit permeation of a desired fluid, such as water, from within the package and thereby avoid premature failure of the electrical component, the gas generated within the package escaping from the package by permeation through the package without exposure of the inside of the package to the ambient.

3. The packaged electrical component of claim 1 wherein the selectively permeable material of the package is chosen from the group consisting of silicone rubber, polypropylene, natural rubber, butyl rubber, polytetrafluoroethylene, glass-filled polytetrafluoroethylene, and polyethylene.

4. The packaged electrical component of claim 1 wherein the electrical component is chosen from the group consisting of at least one electrochemical cell, an electrolytic capacitor, and at least one double layer capacitor element.

5. The packaged electrical component of claim 1 wherein the package is a unitary molded body encapsulating the electrical component with the leads extending from the package.

6. The packaged electrical component of claim 1 wherein the package includes a container and an end closing and engaging the container.

7. The packaged electrical component of claim 6 wherein the container and end include a complementary groove and flange for mutual engagement to retain the end in the container.

8. A packaged electrical component including:
   an electrical component having at least two electrical leads, the electrical component generating a gas during operation; and
   a package enclosing the electrical component with the leads extending from the package, the package being entirely made of selectively permeable materials having a relatively high permeability to a gas generated within the package during operation of the electrical component and a relatively low permeability to at least one other gas present inside the package, the package including means for adjusting permeability of the package.

9. The packaged electrical component of claim 8 wherein the means for adjusting permeability of the package comprises a metallization disposed on at least part of the selectively permeable materials.

10. The packaged electrical component of claim 8 wherein the package can withstand a maximum internal pressure of $P_i$ without damage, the package having an effective area A and an effective thickness t through which gas generated in the package can permeate, wherein the ratio of t/A is less than $\sigma P_i/R$, where $\sigma$ is the permeability of the permeable material of the package to the gas generated within the package and R is the rate of generation of gas within the package, and sufficiently large to limit permeation of a desired fluid, such as water, from within the package and thereby avoid premature failure of the electrical component, the gas generated within the package escaping from the package by permeation through the package without exposure of the inside of the package to the ambient.

11. The packaged electrical component of claim 1 wherein the selectively permeable materials of the package are chosen from the group consisting of silicone rubber, polypropylene, natural rubber, buctyl rubber, polytetrafluoroethylene, glass-filled polytetrafluoroethylene, polyethylene, and combinations thereof.

12. The packaged electrical component of claim 8 wherein the electrical component is chosen from the group consisting of at least one electrochemical cell, an electrolytic capacitor, and at least one double layer capacitor element.

13. The packaged electrical component of claim 8 wherein the package is a unitary molded body encapsulating the electrical component with the leads extending from the package.

14. The packaged electrical component of claim 8 wherein the package includes a container and an end closing and engaging the container.

15. The packaged electrical component of claim 14 wherein the container and end include a complementary groove and flange for mutual engagement to retain the end in the container.

16. The packaged electrical component of claim 8 wherein the means for adjusting permeability of the package includes at least one recess in the selectively permeable materials of the package.

17. The packaged electrical component of claim 8 wherein the package includes a first selectively permeable material and the means for adjusting permeability of the package includes a coating of a second selectively permeable material on at least part of the first selectively permeable material.

* * * * *

UNITED STATES PATENT AND TRADEMARK OFFICE
CERTIFICATE OF CORRECTION

PATENT NO. : 5,400,211
DATED : March 21, 1995
INVENTOR(S) : David A. Evans

It is certified that error appears in the above-indentified patent and that said Letters Patent is hereby corrected as shown below:

Column 11, Line 25, change "1" to --8--;

Line 28, change "buctyl" to --butyl--.

Signed and Sealed this

Eighteenth Day of July, 1995

*Attest:*

BRUCE LEHMAN

*Attesting Officer*     *Commissioner of Patents and Trademarks*